United States Patent
Park et al.

(10) Patent No.: US 9,438,894 B2
(45) Date of Patent: Sep. 6, 2016

(54) METHOD OF PROVIDING 3D IMAGE AND 3D DISPLAY APPARATUS USING THE SAME

(75) Inventors: Jae-sung Park, Seoul (KR); Do-sung Jung, Suwon-si (KR); Tae-Don Hwang, Suwon-si (KR); Tae-hyeun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 12/980,513

(22) Filed: Dec. 29, 2010

(65) Prior Publication Data

US 2011/0248859 A1 Oct. 13, 2011

(30) Foreign Application Priority Data

Apr. 13, 2010 (KR) .......................... 10-2010-0033807

(51) Int. Cl.
*H04N 13/04* (2006.01)

(52) U.S. Cl.
CPC ...... *H04N 13/0429* (2013.01); *H04N 13/0497* (2013.01)

(58) Field of Classification Search
USPC ........................................................ 340/636
See application file for complete search history.

(56) References Cited

U.S. PATENT DOCUMENTS

| | | | | |
|---|---|---|---|---|
| 5,043,651 A * | 8/1991 | Tamura | ........................ | 320/136 |
| 6,087,952 A * | 7/2000 | Prabhakaran | .............. | 340/693.5 |
| 7,474,103 B2 | 1/2009 | Yamada et al. | | |
| 2004/0189248 A1* | 9/2004 | Boskovitch et al. | ......... | 320/116 |
| 2007/0232255 A1* | 10/2007 | Masuda | .................... | 455/343.1 |
| 2008/0119273 A1 | 5/2008 | Yamada et al. | | |
| 2009/0156136 A1 | 6/2009 | Shimizu | | |
| 2010/0007582 A1 | 1/2010 | Zalewski | | |
| 2010/0033462 A1 | 2/2010 | Hasegawa et al. | | |
| 2010/0077337 A1 | 3/2010 | Yang et al. | | |
| 2010/0194857 A1* | 8/2010 | Mentz et al. | .................. | 348/43 |
| 2011/0249102 A1* | 10/2011 | MacNaughton et al. | ....... | 348/56 |

FOREIGN PATENT DOCUMENTS

| | | |
|---|---|---|
| EP | 1 681 658 A2 | 7/2006 |
| JP | 2008-125677 A | 6/2008 |

OTHER PUBLICATIONS

Communication from the European Patent Office issued Dec. 16, 2013 in a counterpart European Application No. 11160011.0.
Communication dated May 26, 2016, issued by the Korean Intellectual Property Office in counterpart Korean Patent Application No. 10-2010-0033807.

* cited by examiner

*Primary Examiner* — Fekadeselassie Girma
*Assistant Examiner* — Cal Eustaquio
(74) *Attorney, Agent, or Firm* — Sughrue Mion, PLLC

(57) ABSTRACT

Provided are a three dimensional (3D) display apparatus, a method of setting up a graphic user interface (GUI) thereof, and 3D glasses. The method of providing a GUI of the 3D display apparatus operating in association with the 3D glasses includes receiving a signal including battery information from the 3D glasses, generating a GUI related to the battery information of the 3D glasses, using the battery information contained in the received signal, and displaying the generated GUI on a screen of the 3D display apparatus.

25 Claims, 8 Drawing Sheets

METHOD OF PROVIDING 3D IMAGE AND 3D DISPLAY APPARATUS USING THE SAME

CROSS-REFERENCE TO RELATED APPLICATION

This application claims priority from Korean Patent Application No. 10-2010-033807, filed on Apr. 13, 2010, in the Korean Intellectual Property Office, the disclosure of which is incorporated herein by reference in its entirety.

BACKGROUND

1. Field

Apparatuses, methods and glasses consistent with exemplary embodiments relate to a three dimensional (3D) display apparatus, which implements a manner of displaying a 3D image in which a left-eye image and a right-eye image are displayed by turns, a GUI setup method thereof, and 3D glasses.

2. Description of the Related Art 3D image technology has been applied in various fields such as communications, broadcasting, medical services, education, military, computer games, computer animation, virtual reality, computer-aided design (CAD), industrial technology, and the like. For all of the above areas, 3D image technology is a key enabling technology of the next generation 3D multimedia telecommunication.

A person perceives stereoscopic sense due to related effects, including changes in the thickness of a person's lens depending on a position of an object being viewed, the difference in the angle of the object as perceived by the left eye and the right eye, changes in position and form of the object as perceived by the left eye and the right eye, disparity caused by object movement, and various other psychological and memory effects.

The binocular disparity, caused by an approximate 6 to 7 centimeters lateral distance between a person's left and right eyes, is one of the most influential causes of the stereoscopic sense. Due to binocular disparity, a person perceives an object at different angles, causing the left and right eyes to receive different images from each other and thus enabling a the person's brain to perceive an object with depth by fusing the two different pieces of image information precisely as these are received through the retina.

3D image display apparatuses are generally classified as eyeglasses types or non-eyeglasses types. An eyeglasses type apparatus may be a color filter apparatus which filters an image using a color having complementary color filters; a polarizing filter type apparatus which divides an image into left- and right-eye images using a shading effect caused by combining orthogonal polarized light elements; and a shutter glasses type apparatus which alternately blocks a left eye and a right eye in response to a synchronization signal that projects a left-eye image signal and a right-eye image signal onto a screen.

However, it is necessary for a viewer to wear 3D glasses to view an image from an eyeglasses type apparatus.

Most 3D glasses employ built-in batteries therein to provide power, particularly because currently commercialized 3D image providing systems are wireless. These batteries can be recharged, or replaced with new ones when discharged.

The problem is that, it is difficult for a viewer to check the battery status of the 3D glasses, so the viewer does not have access to the information such as the duration of battery use or remaining life of the battery.

Therefore, a method is desired, which enables a viewer to access information about the battery of the 3D glasses conveniently and easily.

SUMMARY OF THE INVENTION

Exemplary embodiments overcome the above disadvantages and other disadvantages not described above. Also, the exemplary embodiments are not required to overcome the disadvantages described above, and an exemplary embodiment of the present inventive concept may not overcome any of the problems described above.

According to an aspect of an exemplary embodiment, there is provided a method of providing a graphic user interface (GUI) of a 3D display apparatus operating in association with 3D glasses, the method including: receiving a signal including battery information from the 3D glasses, generating a GUI related to the battery information of the 3D glasses, using the battery information contained in the received signal, and displaying the generated GUI on a screen of the 3D display apparatus.

The battery information may include at least one of a remaining battery capacity of the 3D glasses and an expected battery runtime of the 3D glasses.

The receiving may include receiving a signal containing the battery information from the 3D glasses when a button included in the 3D glasses is actuated.

The signal including the battery information may be generated in response to a synchronous signal which synchronizes the 3D glasses and the 3D display apparatus.

The method providing a GUI of a 3D display apparatus operating in association with 3D glasses may additionally include determining whether a remaining battery capacity of the 3D glasses is below a predetermined value, based on the received battery information, generating, by a GUI generating unit, a GUI notifying to replace or recharge a battery, if it is determined that the remaining battery capacity is less than the predetermined value, and displaying the generated GUI on a screen of the display apparatus.

The method may additionally include outputting an alarm sound notifying to replace or recharge the battery of the 3D glasses, if it is determined that the remaining battery capacity of the 3D glasses is less than the predetermined value.

The method may additionally include generating a signal including a message notifying to replace or recharge the battery of the 3D glasses, if it is determined that the remaining battery capacity of the 3D glasses is less than the predetermined value, and transmitting the generated signal to the 3D glasses.

The generating may include generating the GUI regarding the battery information of the 3D glasses, if a button included in an external device operating in association with the 3D display apparatus is actuated.

According to an aspect of another exemplary embodiment, there is provided a 3D display apparatus which operates in association with 3D glasses, the 3D display apparatus including a GUI generating unit which generates a GUI, a display unit which displays the GUI, a communicating unit which receives a signal including battery information from the 3D glasses, and a control unit which controls the GUI generating unit and the display unit to generate a GUI related to the battery information of the 3D glasses based on the battery information contained in the received signal and controls the display unit display the generated GUI.

The battery information may include at least one of a remaining battery capacity of the 3D glasses and an expected battery runtime of the 3D glasses.

The communicating unit may receive a signal containing the battery information from the 3D glasses when a button included in the 3D glasses is actuated.

The signal containing the battery information may be a response signal to a synchronous signal sent by the communicating unit which synchronizes the 3D glasses and the 3D display apparatus.

The control unit may determine whether a remaining battery capacity of the 3D glasses is below a predetermined value, based on the received battery information, and controls the GUI generating unit to generate a GUI to advise a user to replace or recharge a battery, if it is determined that the remaining battery capacity is less than the predetermined value.

The control unit may control an audio output unit to output an alarm sound to notify a to replace or recharge the battery of the 3D glasses, if it is determined that the remaining battery capacity of the 3D glasses is below the predetermined value.

The control unit may generate a signal containing a message notifying to replace or recharge the battery of the 3D glasses, if it is determined that the remaining battery capacity of the 3D glasses is less than the predetermined value, and controls the communicating unit to transmit the generated signal to the 3D glasses.

The control unit may control the GUI generating unit to generate the GUI regarding the battery information of the 3D glasses, when a button included in an external device operating in association with the 3D display apparatus is actuated.

According to an aspect of another exemplary embodiment, there is provided 3D glasses operating in association with a 3D display apparatus, the 3D glasses including: a transmitting and receiving unit which is communicably linked to the 3D display apparatus, and a control unit which determines at least one of a remaining battery capacity and an expected battery runtime of the 3D glasses and transmits a result of the determination to the 3D display apparatus through the transmitting and receiving unit.

The 3D glasses may additionally include a speaker unit which outputs an alarm sound, wherein the control unit controls the speaker unit to output the alarm sound, if it is determined that the remaining battery capacity or the expected battery runtime of the 3D glasses is less than a predetermined value or a predetermined time duration.

The 3D glasses may additionally include a light emitting diode (LED) unit, wherein the control unit controls the LED unit to be illuminated for a predetermined time interval, if it is determined that the remaining battery capacity or the expected battery runtime of the 3D glasses is less than a predetermined value or a predetermined time duration.

The 3D glasses may additionally include a button located on an eyeglass frame, wherein when the button on the eyeglass frame is actuated, the control unit may determine at least one of a remaining battery capacity and an expected battery runtime of the 3D glasses, and control the transmitting and receiving unit to transmit the determined remaining battery capacity or the determined expected battery runtime of the 3D glasses to the 3D display apparatus.

The control unit may control at least one of the speaker unit and the LED unit to output an alarm sound to be illuminated for a predetermined time interval, respectively, when a predetermined signal containing a message indicating an insufficient remaining battery capacity from the 3D display apparatus is received.

According to an aspect of another exemplary embodiment, there is provided 3D glasses operating in association with a 3D display apparatus, the 3D glasses including a glass driving unit which generates a driving signal to open and close a left glass and a right glass, and a control unit which determines at least one of a remaining battery capacity and an expected battery runtime, and if the determined remaining battery capacity or the determined expected battery runtime is below a predetermined value or a predetermined time duration, controls the glass driving unit to generate a driving signal has an adjusted duty cycle.

The control unit may control the glass driving unit to adjust the duty cycle to be less than the previous duty cycle, if it is determined that the remaining battery capacity or the expected battery runtime is less than the predetermined value or the predetermined time duration.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

Figure 1:
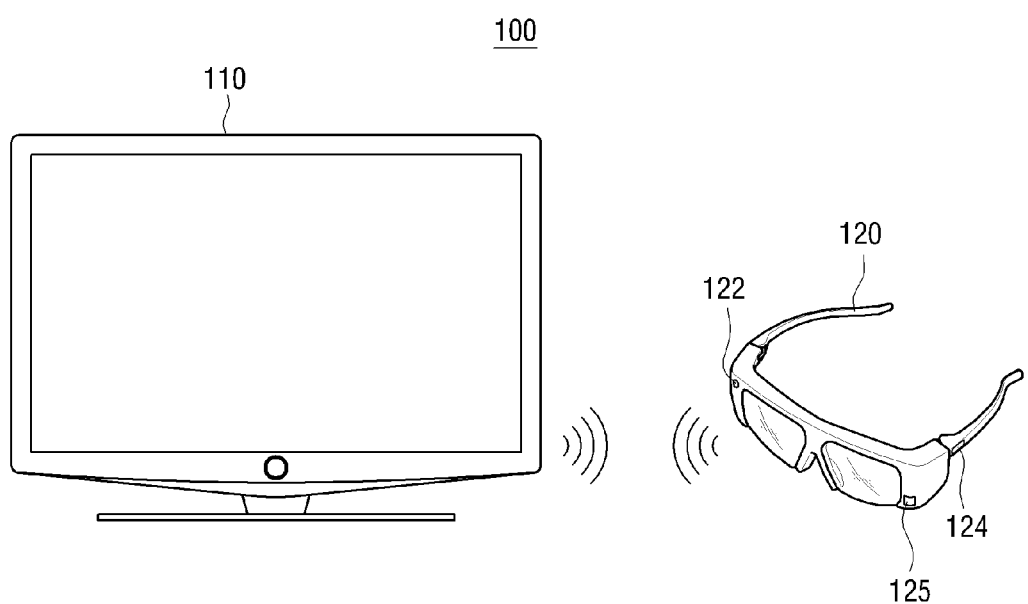
FIG. 1 is an illustration of a system to explain a method of providing a GUI regarding 3D glasses battery information according to an exemplary embodiment.

FIG. 1 is an illustration of a system 100 to explain a method of providing a GUI regarding 3D glasses battery information, according to an exemplary embodiment. Referring to FIG. 1, the system 100, which provides a GUI regarding battery information of the 3D glasses 120, may include a 3D TV 110 which displays a 3D image, and 3D glasses 120 through which a user views the 3D image displayed.

The 3D TV 110 is a display apparatus, which may receive a 3D image from a photographing device such as a camera, or receive a 3D image from a broadcasting station, where an image captured through a camera is edited and/or processed and transmitted, process the received 3D image, and display the result. Particularly, the 3D TV 110 may process left-eye images and right-eye images with reference to the 3D image format, and cause the processed left- and right-eye images to be time-divided and displayed alternately. The 3D TV 110 may additionally generate a synchronous signal in sync with the timing with which the time-divide left- and right-eye images are displayed, and transmits the synchronous signal to the 3D glasses 120.

The 3D TV 110 may receive from the 3D glasses 120 a signal containing battery information of the 3D glasses 120, and generate graphic user interface (GUI) regarding the battery information of the 3D glasses 120 based on the received battery information. The received battery information may include a remaining charge of the 3D glasses battery, or expected battery runtime of the 3D glasses 120.

Figure 2:
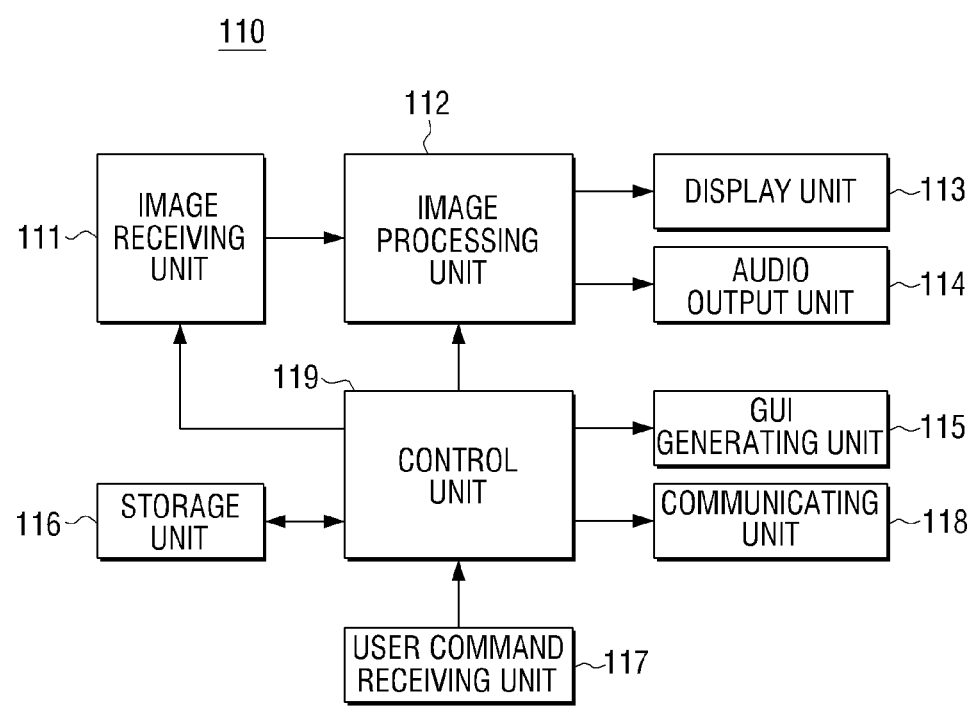
FIG. 2 is a block diagram which illustrates a 3D TV according to an exemplary embodiment.

The construction of the 3D TV 110 will be explained in detail below, with reference mainly to FIG. 2. FIG. 2 is a block diagram of a 3D TV 110 according to an exemplary embodiment.

As illustrated, the 3D TV 110 according to an exemplary embodiment may include an image receiving unit 111, an image processing unit 112, a display unit 113, an audio output unit 114, a GUI generating unit 115, a storage unit 116, a user command receiving unit 117, a communicating unit 118, and a control unit 119.

The image receiving unit 111 may receive, in wired or wireless manner, a broadcast from a broadcasting station or a satellite. The image receiving unit 111 may additionally be connected to an external device such as a camera to receive a 3D image therefrom. The image receiving unit 111 may be connected to the external device wirelessly, or in a wired manner that may implement interfaces such as S-Video, component, composite, D-Sub, DVI, HDMI, or any other wired interface. A 3D image in a variety of formats may be sent to the image receiving unit 111, these formats including a frame sequential format, a top-bottom format, a side-by-side format, a horizontal interleave format, a vertical interleave format, and a checkerboard format.

The image receiving unit 111 may transmit the received 3D image to the image processing unit 112.

The image processing unit 112 may carry out operations including, signal processing such as video decoding of the 3D image received at the image receiving unit 111, format analysis, or video scaling. The image processing unit 112 may also perform GUI addition. In particular, the image processing unit 112 may generate a left-eye image and a right-eye image each corresponding to a size of one screen, using the format of the 3D image received at the image receiving unit 111.

Additionally, the image processing unit 112 may add a GUI, received from the GUI generating unit 115 which will be explained in detail below, to the left-eye image, the right-eye image, or both.

The image processing unit 112 may time-divide the extracted left- and right-eye images, and transmit the result to the display unit 113 alternately. Specifically, the image processing unit 112 may transmit the images to the display unit 113 in the time order of: left-eye image (L1)→right-eye image (R1)→left-eye image (L2)→right-eye image (R2) →and so on.

The display unit 113 may output and provide the user with the left- and right-eye images output from the image processing unit 112 alternately.

The audio output unit 114 may output and provide the user with an audio processed at the image processing unit 112. Particularly, the audio output unit 114 may output an alarm sound or audio message to notify a user to replace or recharge the 3D glasses battery, if information is received, indicating that the 3D glasses 112 have an insufficient battery power.

By way of example, the 3D TV 110 may determine that the 3D glasses have an insufficient battery power if the remaining battery capacity is lower than a predetermined value, or if the expected battery runtime of the 3D glasses 120 is shorter than a predetermined time duration, and output an alarm sound notifying a user to replace or recharge the battery. The alarm sound may take the form of a direct audio message such as 'Recharge 3D glasses battery,' or 'Replace 3D glasses battery,' or indirect message such as a beep sound.

The GUI generating unit 115 may generate a GUI to appear on a display. The GUI generated at the GUI generating unit 115 may be sent to the image processing unit 112, and added to the left- or right-eye image which will be presented on the display. The generated GUI may be added to both of the left- and right-eye images.

Additionally, the GUI generating unit may generate a GUI regarding battery information of the 3D glasses 120, based on the battery information received at the 3D TV 110.

The GUI which contains battery information of the 3D glasses 120 will be explained in detail below, with reference to FIGS. 4 to 6.

Figure 4:
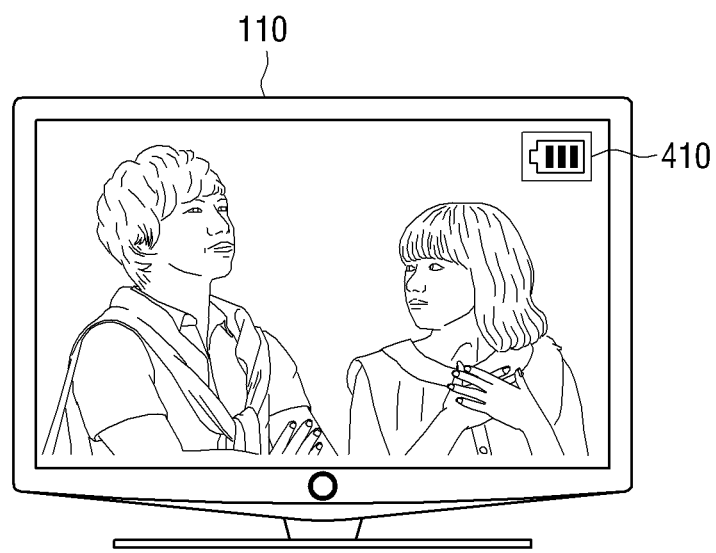
FIG. 4 is a view which illustrates a screen displaying thereon a GUI regarding a remaining battery power of 3D glasses according to an exemplary embodiment.

FIG. 4 illustrates a screen on which a GUI regarding remaining battery capacity of the 3D glasses 120, according to an exemplary embodiment.

If the 3D TV 110 receives information regarding the remaining battery capacity of the 3D glasses 120 from the 3D glasses 120, as illustrated in FIG. 4, the GUI generating unit 115 may generate a GUI 410 in a battery shape which is divided into three parts. If the remaining battery capacity of the 3D glasses 120 greater than about 70% of the full capacity, the GUI 410 appears in a battery shape in which all three parts are filled with dark bars. If the remaining battery capacity ranges from about 30% to about 70%, the GUI 410 appears in a battery shape in which two out of three parts are filled with dark bars. If the remaining battery capacity is less than about 10%, the GUI 410 appears in a battery shape in which all three parts are empty, and the GUI 410 may additionally flicker.

Although the battery-shape GUI 410 having three parts is explained as an example, this is only for illustrative purpose, and therefore, the technical concept of the exemplary embodiment may be equally applied to other examples such as, for example, where the battery-shape GUI 410 includes more or less than three parts.

Figure 5:
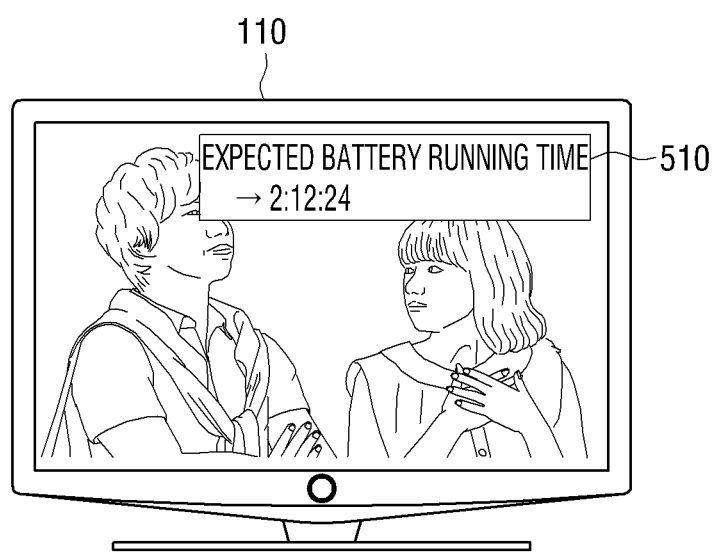
FIG. 5 is a view which illustrates a screen displaying thereon a GUI regarding an expected battery runtime of the 3D glasses according to an exemplary embodiment.

FIG. 5 illustrates a screen on which a GUI regarding an expected battery runtime of the 3D glasses, according to an exemplary embodiment.

If the 3D TV 110 receives information regarding the expected battery runtime of the 3D glasses 120 from the 3D glasses 120, as illustrated in FIG. 5, the GUI generating unit 115 may generate a GUI 510 which indicates the expected battery runtime of the 3D glasses 120. The generated GUI may indicate hours, minutes and seconds as the time units. The GUI 510 may flicker if the received expected battery runtime of the 3D glasses 120 is less than a predetermined time unit, for example, less than 5 minutes.

Figure 6:
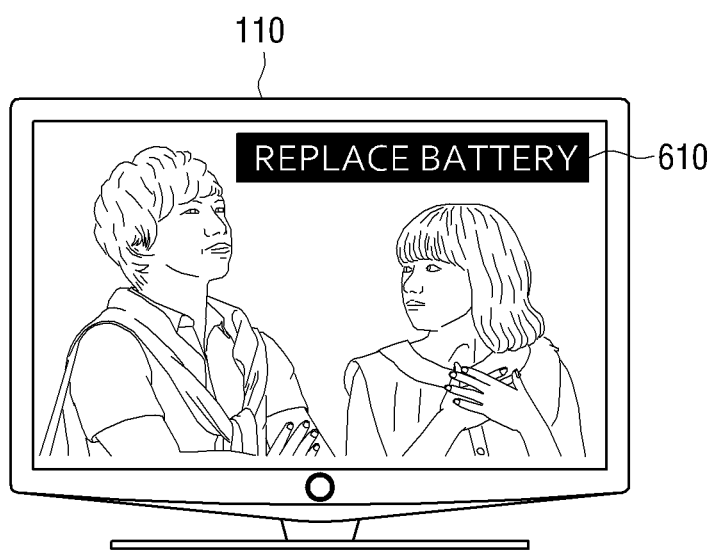
FIG. 6 is a view which illustrates a screen displaying thereon a GUI including a message advising to replace a 3D glasses battery according to an exemplary embodiment.

FIG. 6 illustrates a screen on which a GUI, including a message advising a user to replace the battery of the 3D glasses 120, is displayed.

If the information received from the 3D glasses 120 indicates that the battery capacity of the 3D glasses 120 is less than a predetermined value, the GUI generating unit 115 may generate a GUI 610 including a message advising a user to replace the battery of the 3D glasses 120. Specifically, if the information received from the 3D glasses 120 indicates that the battery capacity of the 3D glasses 120 is less than 10% of the full capacity, the GUI generating unit 115 may generate the GUI 610 including a message advising a user to replace the battery in the 3D glasses 120. The generated GUI 610 may flicker to draw the user's attention.

If the information received from the 3D glasses 120 indicates that the expected battery runtime of the 3D glasses 120 is less than a predetermined time duration, the GUI generating unit 115 may generate a GUI 610 including a message advising a user to replace the battery. Specifically, if the expected battery runtime received from the 3D glasses 120 is less than about 5 minutes, the GUI generating unit 115 may generate a GUI indicating a user to replace the battery of the 3D glasses. The generated GUI 610 may flicker to draw the user's attention.

Although the GUI generating unit 115 generates the GUI 610 which includes the message advising to replace the battery, this is only for an illustrative purpose, and therefore, the GUI generating unit 115 may generate various configurations of GUIs. For example, the GUI may include a message advising a user to recharge the battery.

The storage unit 116 is a storage medium on which various programs necessary to operate the 3D TV 110 are stored, and may be implemented as a memory, a hard disk drive (HDD), or other storage device.

The user command receiving unit 117 may transmit a user command received through input means such as remote control, to the control unit 119.

The communicating unit 118 may generate a synchronous signal in sync with the left- and right-eye images which are alternately output, and transmit the generated synchronous signal to the 3D glasses 120 as an infrared ray. This is to cause the 3D glasses 120 to open and close alternately in sync with the 3D TV 110 so that the display unit 113 displays the left-eye image while the left glass of the 3D glasses 120 is open, and displays the right-eye image while the right glass of the 3D glasses 120 is open.

Additionally, the communicating unit 118 may receive from the 3D glasses 120 a signal containing battery information of the 3D glasses 120. The signal containing the battery information may be an acknowledgement (ACK) signal transmitted in response to the sync signal transmitted from the 3D TV 110. In radio frequency (RF) communication, if a specific signal is received, an ACK signal is transmitted as a response. Thus, the 3D glasses 110 may transmit an ACK signal as a response, upon receiving a synchronous signal from the 3D TV 110. By inserting index values (such as a voltage value) regarding the battery information of the 3D glasses 120 into the ACK signal, the 3D glasses 120 may transmit the battery information to the 3D TV 110. According to what is described above, extra expense is saved because an existing signal is used to transmit the battery information.

The communicating unit 118 may not automatically receive the battery information of the 3D glasses 120. Instead, the communicating unit 118 may receive the battery information of the 3D glasses 120 only when a button on the 3D glasses 120 is pressed.

The control unit 119 may control the overall operations of the 3D TV 110 according to the user commands received through the user command receiving unit 117.

Particularly, the control unit 119 may control the image receiving unit 111 and the image processing unit 112 in a manner such that the separated left- and right-eye images are scaled or interpolated to a size suitable for displaying on a screen. Additionally, the control unit 119 may control the GUI generating unit 115 to generate a GUI in accordance with the user command received through the user command receiving unit 117, and control the communicating unit 118 to generate and transmit a synchronous signal in sync with the timing of outputting the left- and right-eye images.

Specifically, the control unit 119 may control the GUI generating unit 114, based on the battery information contained in the signal received through the communicating unit 118, to generate the GUI regarding the battery information of the 3D glasses 120, and further may control the display unit 113 to cause the generated GUI to be displayed.

If the remaining battery capacity of the 3D glasses 120 is received from the 3D glasses 120, as explained above with reference to FIG. 4, the control unit 119 may control the GUI generating unit 114 to generate a battery-shape GUI 410 having a plurality of parts. Additionally, if the expected battery runtime of the 3D glasses 120 is received from the 3D glasses 120, as explained above with reference to FIG. 5, the control unit 119 may control the GUI generating unit 114 to generate the GUI 510 indicating the expected battery runtime of the 3D glasses.

Additionally, if the information received from the 3D glasses 120 indicates the remaining battery capacity of the 3D glasses 120 is less than a predetermined value, for example, less than 10% of the full capacity, the control unit 119 may control the GUI generating unit to generate a GUI including a message advising a user to replace or recharge the. Likewise, if the information received from the 3D glasses 120 indicates the expected battery runtime of the 3D glasses 120 is less than a predetermined time duration, for example, less than 5 minutes, the control unit 119 may control the GUI generating unit to generate an alarm sound advising a user to replace or recharge the battery is generated. The alarm sound may include a direct message such as 'Recharge 3D glasses battery' or 'replace 3D glasses battery', or indirect message such as a beep sound.

Additionally, if the information received from the 3D glasses 120 indicates the remaining battery capacity of the 3D glasses 120 is less than a predetermined value, for example, less than about 10% of the full capacity, or if the information received from the 3D glasses 120 indicates the expected battery runtime of the 3D glasses 120 is less than a predetermined time duration, for example, less than about 5 minutes, the control unit 119 may control the GUI generating unit to generate a signal containing a message advising a user to replace or recharge the battery is generated, and cause the generated signal to be transmitted to the 3D glasses 120. If the 3D glasses 120 receive the signal containing the message advising to replace or recharge the battery, the 3D glasses 120 may output an alarm sound advising to replace or recharge the battery through the speaker, or cause the LED to flicker. Alternately, the 3D glasses 120 may cause the 3D image to flicker, by adjusting the duty cycle of the driving signal. As a result, the user perceives the lack of battery charge of the 3D glasses 120.

Alternately, the control unit 119 may control the GUI generating unit to generate a GUI regarding the battery information of the 3D glasses 120 only when a predetermined button on the remote control is actuated. This allows the generation of the GUI only when the user wants to check the battery information, instead of displaying the GUI on the 3D image display all the time. The control unit 119 may control the display unit so that the generated GUI disappears if the user actuates the predetermined button again, or if a predetermined time interval elapses.

Accordingly, the user is able to check the battery information or if the battery is running out, more conveniently and easily.

Referring back to FIG. 1, the 3D glasses 120 alternately open and close the left and right glasses in accordance with the synchronous signal received from the 3D TV 110, allowing a user to view the left-eye image through the left eye and view the right-eye image through the right eye. The construction of the 3D glasses 120 will be explained in detail below, with reference mainly to FIG. 3.

Figure 3:
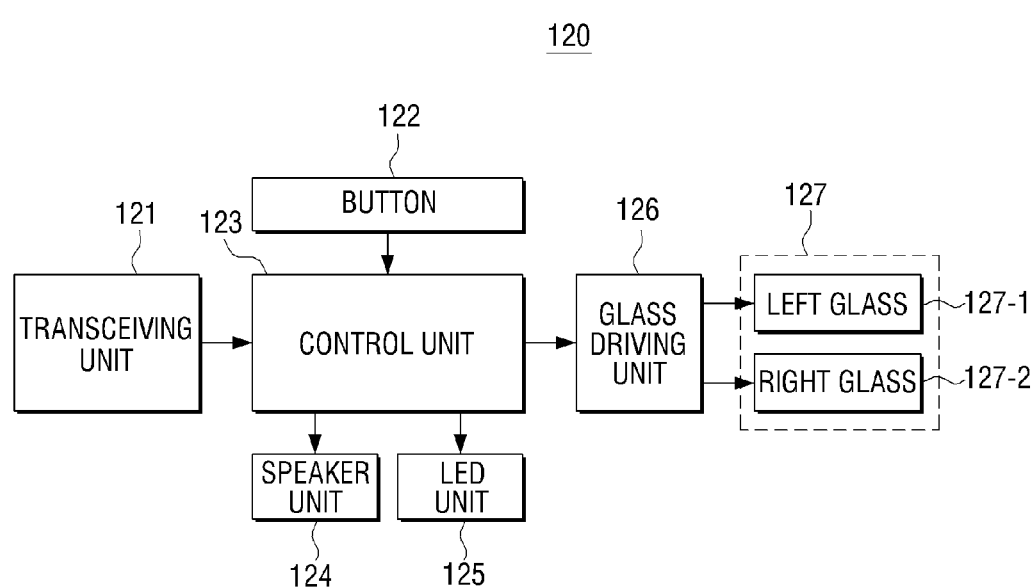
FIG. 3 is a block diagram which illustrates 3D glasses according to an exemplary embodiment.

FIG. 3 is a block diagram of 3D glasses 120 according to an exemplary embodiment. As illustrated, the 3D glasses 120 may include a transceiving unit 121, a button 122, a control unit 123, a speaker unit 124, an LED unit 125, a glass driving unit 126, and a glass unit 127.

The transceiving unit 121 may receive a synchronous signal regarding a 3D image from the communicating unit 118 of the 3D TV 110 by wired or wireless communication. Particularly, the communicating unit 118 may irradiate a synchronous signal using an infrared ray having linearity, and the transceiving unit 121 may receive the synchronous signal from the irradiated infrared ray.

Additionally, the transceiving unit 121 may transmit an ACK signal in response to the synchronous signal. The transmitted ACK signal may include battery information of the 3D glasses 120. Specifically, index values (such as voltage value) regarding the battery information of the 3D glasses 120 may be inserted into the ACK signal and transmitted to the 3D TV 110. In this manner, the 3D TV 110 may receive the battery information of the 3D glasses 120 using the existing ACK signal.

The button 122 may be provided for a user to press to transmit the battery information of the 3D glasses 120 to the 3D TV 110, and be located on an eyeglass frame as illustrated in FIG. 1 for example. Accordingly, the 3D glasses 120 may transmit the battery information of the 3D glasses 120 to the 3D TV 110 only when the button 122 is pressed. If the button 122 is not pressed, the 3D glasses 120 do not transmit the battery information to the 3D TV 110. Although the button 122 is explained as an example, other configurations of input unit such as switch may be implemented.

If it is determined that the battery charge of the 3D glasses 120 is insufficient, the speaker unit 124 may output an alarm sound. The alarm sound may take the form of a direct message such as 'Recharge 3D glasses battery,' or 'Replace 3D glasses battery,' or indirect message such as a beep sound. The speaker unit 124 may be located on an eyeglass frame as illustrated in FIG. 1.

Additionally, if it is determined that the battery charge of the 3D glasses 120 is insufficient, the LED unit 125 may be illuminated for a predetermined time interval. This is to notify the user of the insufficient battery charge. The LED unit 125 may be located near to the glass unit 127 as illustrated in FIG. 1.

The glass driving unit 126 may generate a driving signal based on a control signal received from the control unit 123 which will be explained below in detail.

The glass unit 127 may include a left-eye glass 127-1 and a right-eye glass 127-2, and opens and closes the respective glasses in accordance with the driving signal received from the glass driving unit 126.

The control unit 123 may control the overall operations of the 3D glasses 120. In particular, the control unit 123 may generate a control signal based on the output signal received from the transceiving unit 121, and transmit the generated control signal to the glass driving unit 126 to control the glass driving unit 126 accordingly. Based on the output signal, the control unit 123 may control the glass driving unit 126 to generate a driving signal to drive the glass unit 127.

Additionally, the control unit 123 may compute the battery information of the 3D glasses 120. Specifically, the control unit 123 may compute a remaining battery capacity or an expected battery runtime of the 3D glasses 120. The computation may be achieved based on the voltage value ($V_{cc}$) of the 3D glasses battery. That is, the control unit 123 may measure the voltage value ($V_{cc}$) of the 3D glasses battery, and compare the measured voltage value ($V_{cc}$) with the initial voltage value to compute the remaining battery capacity or expected battery runtime of the 3D glasses 120.

Additionally, the control unit 123 may control the transceiver unit 121 so that the computed battery information is transmitted to the 3D TV 110. The battery information may be carried in the ACK signal when the ACK signal is transmitted as a response to the synchronous signal.

Additionally, the control unit 123 may determine whether the battery charge of the 3D glasses 120 is insufficient. Whether the battery charge is insufficient may be determined based on the remaining battery capacity or expected battery runtime of the 3D glasses 120. For example, if the remaining battery capacity of the 3D glasses 120 is less than a predetermined value (e.g., less than about 10% of the full capacity), or if the expected battery runtime of the 3D glasses 120 is less than a predetermined time duration (e.g., less than about 5 minutes), the control unit 123 may determine that the battery charge of the 3D glasses 120 is insufficient.

If the battery charge of the 3D glasses 120 is determined to be insufficient, the control unit 123 may control the speaker unit 124 so that an alarm sound is output, or control the LED unit 125 to be illuminated for a predetermined time interval.

Additionally, the control unit 123 may control the duty cycle of the driving signal, if determining insufficient battery charge of the 3D glasses 120.

Figure 8:
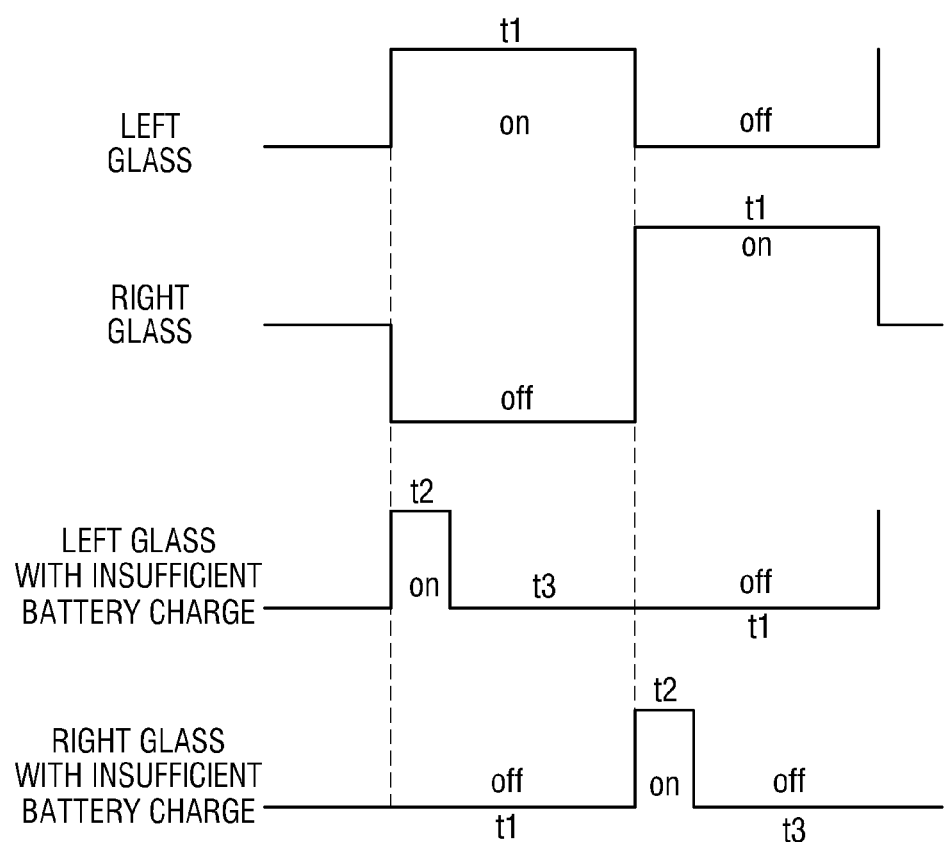
FIG. 8 illustrate rectangular waveforms to explain adjustment of a driving signal of 3D glasses according to insufficient 3D glasses battery charge, according to an exemplary embodiment.

FIG. 8 illustrates rectangular waveforms provided to explain adjustment of a driving signal of the 3D glasses 120 according to insufficient battery charge.

As illustrated by the first and the second rectangular waveforms on the top of FIG. 8, the left and the right glasses have driving signals which are on or off during t1. That is, the duration of the driving signal is t1. If it is determined that the 3D glasses 120 have insufficient battery charge, the control unit 123 may control the glass driving unit to shorten the duty cycle of the driving signal. As illustrated by the third and the fourth rectangular waveforms on the bottom of FIG. 8, the control unit 123 adjusts down the duration of an on period, that is, adjusts the duration of the duty cycle from t1 to t2, thereby causing a flickering phenomenon in the 3D image. By the flickering of the 3D image, the user notices that the battery charge is insufficient.

The method of providing a GUI of the 3D TV 110 according to an exemplary embodiment will be explained in greater detail below, with reference to FIG. 7.

Figure 7:
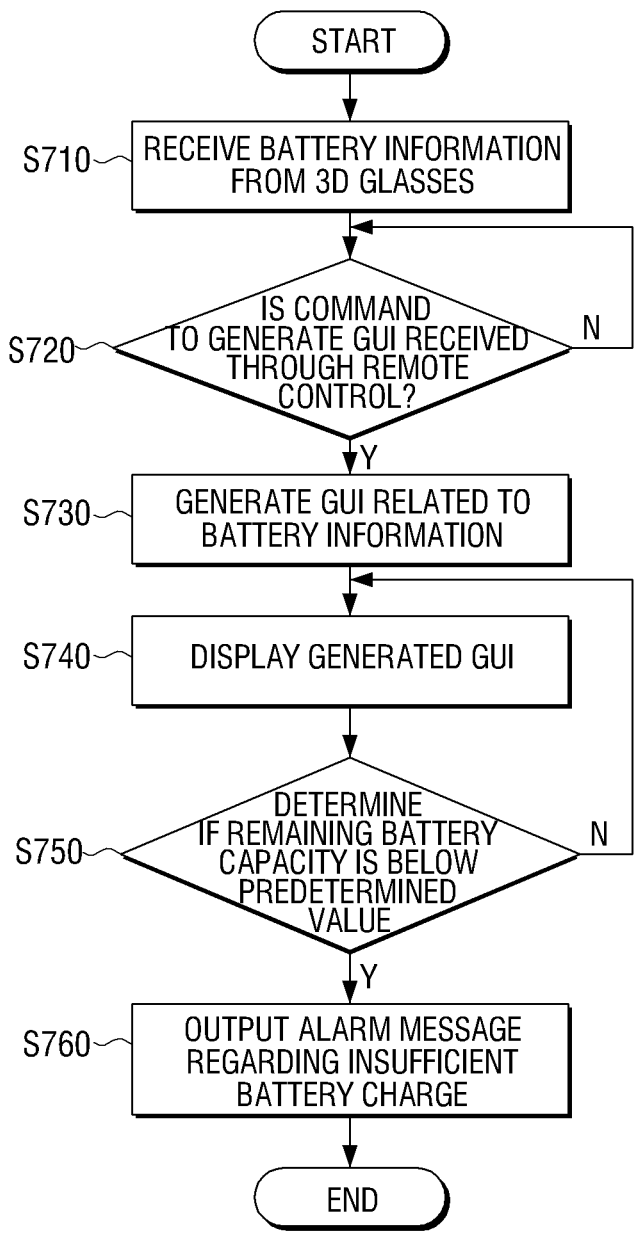
FIG. 7 is a flowchart provided to explain a method of providing a GUI in a 3D TV according to an exemplary embodiment.

FIG. 7 is a flowchart illustrating a method of providing a GUI of the 3D TV 110 according to an exemplary embodiment.

At S710, the 3D TV 110 receives battery information from the 3D glasses 120. The battery information may be included in an ACK signal transmitted in response to a synchronous signal. At S720, the 3D TV 110 determines whether a GUI generation command is received through a remote control or not. At S720-Y, if it is determined that the GUI generation command is received through the remote control, at S730, the 3D TV 110 generates a GUI related to the battery information. The battery information may include a remaining battery capacity, an expected battery runtime of the 3D glasses 120, or other information. At S740, the 3D TV 110 displays the generated GUI.

At S750, the 3D TV 110 determines whether the battery capacity of the 3D glasses 120 is lower than a predetermined value. For example, the 3D TV 110 may determine if the battery capacity of the 3D glasses 120 is less than about 10% of the full capacity. At S750-Y, if it is determined that the battery capacity is less than a predetermined value, the 3D TV 110 outputs a warning message related to the insufficient battery charge. For example, the 3D TV 110 may generate a GUI which contains a message advising to replace or recharge the battery, and output an alarm sound which contains a message advising to replace or recharge the battery.

As a result, a user can check the battery information of the 3D glasses 120 and also check if the battery charge is insufficient or not easily and conveniently.

Although the 3D TV 110 is explained as an example of a 3D display apparatus in the exemplary embodiments explained above, this is only for illustrative purpose. Accordingly, the technical concept of what is described herein is equally applicable to any 3D display apparatus which is capable of displaying shutter glass type 3D images. By way of example, a 3D projection or 3D monitor may be implemented as an example of the 3D display apparatus.

Furthermore, although it is determined that the battery charge is insufficient if the current battery capacity is less than about 10% of the full capacity in the exemplary embodiments explained above, this is only for illustrative purpose. Accordingly, the technical concept of what is described herein is equally applicable to other reference values.

Furthermore, although it is determined that the battery charge is insufficient if the expected battery runtime of the 3D glasses is less than about 5 minutes in the exemplary embodiments explained above, this is only for illustrative purpose. Accordingly, the technical concept of what is described herein is equally applicable to other reference time duration.

Furthermore, although the battery information and information about insufficient battery charge is represented as a GUI in the exemplary embodiments explained above, other known displaying methods may be applied.

As explained above, since the 3D display apparatus displays a GUI regarding the battery information of the 3D glasses, a user is able to check the battery information of the 3D glasses more easily and conveniently.

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing a graphic user interface (GUI) of a three dimensional (3D) display apparatus operating in association with 3D glasses, the method comprising:
    transmitting a synchronous signal to synchronize timing of output of a left eye image and a right eye image between the 3D glasses and the 3D display apparatus, to the 3D glasses;
    receiving a signal including battery information on remaining battery power of the 3D glasses from the 3D glasses, in response to transmitting the synchronous signal to the 3D glasses;
    generating a GUI related to the battery information of the 3D glasses, using the battery information contained in the received signal; and
    displaying the generated GUI on a screen of the 3D display apparatus,
    wherein the received signal is an acknowledgment signal configured to acknowledge receipt of the synchronous signal by the 3D glasses.

2. The method of claim 1, wherein the battery information comprises at least one of a remaining battery capacity of the 3D glasses and an expected battery runtime of the 3D glasses.

3. The method of claim 1, wherein the receiving comprises receiving a signal containing the battery information from the 3D glasses when a button included in the 3D glasses is actuated.

4. The method of claim 1, further comprising:
    determining whether a remaining battery capacity of the 3D glasses is less than a predetermined value, based on the received battery information;
    generating a GUI notifying to replace or recharge a battery, if it is determined that the remaining battery capacity is less than the predetermined value; and
    displaying the generated GUI on a screen of the 3D display apparatus.

5. The method of claim 4, further comprising outputting an alarm sound notifying to replace or recharge the battery of the 3D glasses, if it is determined that the remaining battery capacity of the 3D glasses is less than the predetermined value.

6. The method of claim 4, further comprising:
    generating a signal including a message notifying to replace or recharge the battery of the 3D glasses, if it is determined that the remaining battery capacity of the 3D glasses is less than the predetermined value; and
    transmitting the generated signal to the 3D glasses.

7. The method of claim 1, wherein the generating comprises generating the GUI related to the battery information of the 3D glasses, if a button included in an external device operating in association with the 3D display apparatus is actuated.

8. A three dimensional (3D) display apparatus which operates in association with 3D glasses, the 3D display apparatus comprising:
    a graphic user interface (GUI) generating unit which generates a GUI;
    a display unit which displays the GUI;
    a communicating unit which transmits to the 3D glasses a synchronous signal to synchronize timing of output of a left eye image and a right eye image between the 3D glasses and the 3D display apparatus, and receives a signal including battery information on remaining battery power of the 3D glasses from the 3D glasses in response to transmitting the synchronous signal to the 3D glasses; and
    a control unit which controls the GUI generating unit to generate a GUI related to the battery information of the 3D glasses based on the battery information included in the received signal and controls the display unit to display the generated GUI,
    wherein the received signal is an acknowledgment signal configured to acknowledge receipt of the synchronous signal by the 3D glasses.

9. The 3D display apparatus of claim 8, wherein the battery information comprises at least one of a remaining battery capacity of the 3D glasses and an expected battery runtime of the 3D glasses.

10. The 3D display apparatus of claim 8, wherein the communicating unit receives a signal containing the battery information from the 3D glasses when a button included in the 3D glasses is actuated.

11. The 3D display apparatus of claim 8, wherein the control unit determines whether a remaining battery capacity of the 3D glasses is less than a predetermined value, based on the received battery information, and controls the GUI generating unit to generate a GUI to notify to replace or recharge a battery, if it is determined that the remaining battery capacity is less than the predetermined value.

12. The 3D display apparatus of claim 11, wherein the control unit controls an audio output unit to output an alarm sound to notify to replace or recharge the battery of the 3D glasses, if it is determined that the remaining battery capacity of the 3D glasses is less than the predetermined value.

13. The 3D display apparatus of claim 11, wherein the control unit generates a signal containing a message notifying to replace or recharge the battery of the 3D glasses, if it is determined that the remaining battery capacity of the 3D glasses is less than the predetermined value, and controls the communicating unit to transmit the generated signal to the 3D glasses.

14. The 3D display apparatus of claim 8, wherein the control unit controls the GUI generating unit to generate the GUI related to the battery information of the 3D glasses, when a button included in an external device operating in association with the 3D display apparatus is actuated.

15. Three dimensional (3D) glasses operating in association with a 3D display apparatus, the 3D glasses comprising:
a transmitting and receiving unit which is communicably linked to the 3D display apparatus; and
a control unit which receives a synchronous signal to synchronize timing of output of a left eye image and a right eye image between the 3D glasses and the 3D display apparatus, from the 3D display apparatus, determines at least one of a remaining battery capacity and an expected battery runtime of the 3D glasses, and transmits a signal including a result of the determination to the 3D display apparatus through the transmitting and receiving unit,
wherein the signal is an acknowledgment signal configured to acknowledge receipt of the synchronous signal.

16. The 3D glasses of claim 15, further comprising a speaker unit which outputs an alarm sound, wherein the control unit controls the speaker unit to output the alarm sound, if it is determined that the remaining battery capacity or the expected battery runtime of the 3D glasses is less than a predetermined value or a predetermined time duration.

17. The 3D glasses of claim 15, further comprising: a light emitting diode (LED) unit, wherein the control unit controls the LED unit to be illuminated for a predetermined time interval, if it is determined that the remaining battery capacity or the expected battery runtime of the 3D glasses is less than a predetermined value or a predetermined time duration.

18. The 3D glasses of claim 15, further comprising a button located on an eyeglass frame, wherein when the button on the eyeglass frame is actuated, the control unit determines at least one of a remaining battery capacity and an expected battery runtime of the 3D glasses, and controls the transmitting and receiving unit to transmit the determined remaining battery capacity or the determined expected battery runtime of the 3D glasses to the 3D display apparatus.

19. The 3D glasses of claim 15, wherein the control unit controls at least one of a speaker unit and an LED unit to output an alarm sound or to be illuminated for a predetermined time interval, respectively, when a predetermined signal containing a message indicating an insufficient remaining battery capacity from the 3D display apparatus is received.

20. Three dimensional (3D) glasses operating in association with a 3D display apparatus, the 3D glasses comprising:
a glass driving unit which generates a driving signal to open and close a left glass and a right glass; and
a control unit which determines at least one of a remaining battery capacity and an expected battery runtime, and if the determined remaining battery capacity or the determined expected battery runtime is below a predetermined value or a predetermined time duration, controls the glass driving unit to generate the driving signal to have an adjusted duty cycle to thereby create a flickering effect of a 3D image viewed through the 3D glasses,
wherein the adjusted duty cycle has a first time period during which the left glass is driven, a second time period during which the right glass is driven, and a third time period between the first and second time periods during which neither the left or right glasses are driven to thereby create the flickering effect.

21. The 3D glasses of claim 20, wherein the control unit controls the glass driving unit to adjust the duty cycle to be less than the previous duty cycle, if it is determined that the remaining battery capacity or the expected battery runtime is less than the predetermined value or the predetermined time duration.

22. A three-dimensional (3D) image display system comprising:
a set of 3D glasses through which a user views a 3D image; and
a display device which displays a 3D image and provides battery information on remaining battery power of the 3D glasses which is received from the 3D glasses, the battery information being included in an acknowledgment signal configured to acknowledge receipt of a synchronous signal by the 3D glasses,
wherein the synchronous signal is transmitted by the display device to the 3D glasses to synchronize timing of output of a left eye image and a right eye image between the 3D glasses and the 3D display apparatus.

23. Glasses for viewing a three dimensional (3D) image, the glasses comprising:
a transceiver which receives a synchronous signal to synchronize timing of output of a left eye image and a right eye image between the 3D glasses and the 3D display apparatus, from a display device; and
a controller which determines battery information on remaining battery power of the glasses, and controls the transceiver to transmit an acknowledgment signal including the battery information to the display device,
wherein the acknowledgment signal is configured to acknowledge receipt of the synchronous signal.

24. A display device for displaying a three-dimensional (3D) image, comprising:
a communication unit which transmits to a set of 3D image viewing glasses a synchronous signal to synchronize timing of output of a left eye image and a right eye image between the 3D image viewing glasses and the display device, and receives an acknowledgment signal including battery information on remaining battery power of the 3D image viewing glasses from the 3D image viewing glasses; and a controller which controls the communication unit to transmit the synchronous signal to the 3D image viewing glasses and controls the display device to display the battery information, wherein the acknowledgment signal is configured to acknowledge receipt of the synchronous signal by the 3D image viewing glasses.

25. A method for a display device to display a three-dimensional (3D) image, the method comprising:

receiving 3D image information to be displayed;

generating a GUI including battery information on remaining battery power of a set of 3D glasses; and displaying the 3D image information along with the generated GUI, the battery information being included in an acknowledgment signal which is configured to acknowledge receipt of a synchronous signal by the 3D glasses, the acknowledgment signal including battery information on remaining battery power of the 3D glasses, wherein the synchronous signal is transmitted from the display device to the 3D glasses to synchronize timing of output of a left eye image and a right eye image between the 3D glasses and the 3D display apparatus.

* * * * *